United States Patent [19]
Friedman et al.

[11] Patent Number: 5,949,788
[45] Date of Patent: Sep. 7, 1999

[54] METHOD AND APPARATUS FOR MULTIPOINT TRUNKING

[75] Inventors: G. Stodel Friedman, Acton; David J. Husak, Windham; Stephen L. Van Seters, Stow, all of Mass.; Edward A. Heiner, Jr., Londonderry, N.H.

[73] Assignee: 3Com Corporation, Santa Clara, Calif.

[21] Appl. No.: 08/852,146

[22] Filed: May 6, 1997

[51] Int. Cl.⁶ .................................................. H04K 1/10
[52] U.S. Cl. .................. 370/431; 370/536; 375/260; 395/200.3
[58] Field of Search .................................. 370/242, 245, 370/248, 409, 419, 431, 536; 375/260; 395/200.3, 200.81, 200.83; 340/825.03

[56] References Cited

U.S. PATENT DOCUMENTS

| | | | |
|---|---|---|---|
| 5,065,396 | 11/1991 | Castellano | 370/536 |
| 5,231,649 | 7/1993 | Duncanson | 375/260 |
| 5,293,378 | 3/1994 | Shimizu | 370/474 |
| 5,680,400 | 10/1997 | York | 370/473 |
| 5,757,804 | 5/1998 | McGee | 370/510 |

*Primary Examiner*—Chi H. Pham
*Assistant Examiner*—William Luther
*Attorney, Agent, or Firm*—Weingarten, Schurgin, Gagnebin & Hayes LLP

[57] ABSTRACT

A method and apparatus are disclosed which permit multipoint trunking among a plurality of network devices connected by a trunk comprising at least two physical links. A trunk control message protocol (TCMP) is described which assures that message traffic may be delivered to the respective devices over the individual links of the trunk prior to inclusion of the respective links as active links in the trunk. The trunk acts as a single network port for each of the devices utilizing the trunk and is layered over a plurality of media access control (MAC) ports which interface to the respective links. The disclosed trunking technique and apparatus permit the bandwidth of the trunk to be increased in increments through the addition of links to the trunk.

39 Claims, 8 Drawing Sheets

Fig. 1

Header

Fig. 2a

Message Portion

Fig. 2b

| Value | Trunk MAC State |
|---|---|
| 0x00 | Not In Use |
| 0x01 | Selected |
| 0x02 | In Use |

MAC 38
Current List

| 2 | Not In Use |
|---|---|
| 3 | Not In Use |
|   |   |
|   |   |

MAC 40
Current List

| 2 | Not In Use |
|---|---|
| 3 | Not In Use |
|   |   |
|   |   |

MAC 42
Current List

| 2 | Not In Use |
|---|---|
| 3 | Not In Use |
|   |   |
|   |   |

Fig. 6

MAC 210
Current List

| 2 | Not In Use |
|---|---|
| 3 | Not In Use |
|   |   |
|   |   |
|   |   |

MAC 212
Current List

| 5 | Not In Use |
|---|---|
| 6 | Not In Use |
| 7 | Not In Use |
|   |   |
|   |   |

MAC 214
Current List

| 2 | Not In Use |
|---|---|
| 3 | Not In Use |
|   |   |
|   |   |
|   |   |

MAC 216
Current List

| 5 | Not In Use |
|---|---|
| 6 | Not In Use |
| 7 | Not In Use |
|   |   |
|   |   |

MAC 218
Current List

| 2 | Not In Use |
|---|---|
| 3 | Not In Use |
| 5 | Not In Use |
| 6 | Not In Use |
| 7 | Not In Use |

Fig. 7

METHOD AND APPARATUS FOR MULTIPOINT TRUNKING

CROSS REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The present invention relates generally to networking and more particularly to a method and apparatus for performing multipoint trunking between two or more network devices over a plurality of links which appear as a virtual link of increased bandwidth.

BACKGROUND OF THE INVENTION

In networks carrying voice, video or computer data, data is carried over communication links which have a finite bandwidth. As the usage of computer networks has increased, the bandwidth of many existing network links has been demonstrated to be insufficient to accommodate the volume of traffic over such links. It is known in the communication arts to employ point-to-point trunking to increase network bandwidth between two devices for which the bandwidth provided by the connecting communication link is insufficient. When trunking is employed, multiple physical links are employed in parallel to create a single logical link of increased bandwidth. A trunk provides a high speed virtual link between network nodes such as switches, bridges, end-stations or other network devices. A trunk port which acts as the logical interface between a network device and the trunk is layered over a plurality of Media Access Control (MAC) ports.

While known techniques provide for point-to-point trunking between two connected devices, it would be desirable to be able to provide trunking capability among three or more network devices. Such capability however interposes significant problems in assuring that individual communication links which make up the trunk are properly configured and functional.

BRIEF SUMMARY OF THE INVENTION

In accordance with the present invention a method and apparatus are disclosed which permit multipoint trunking among a plurality of network devices interconnected by a trunk comprising at least two physical links. A trunk control message protocol (TCMP) is employed which verifies that message traffic may be delivered to the respective devices over the individual links of the trunk prior to inclusion of the respective links as active links of the trunk. A trunk port within the network device acts a single network port for each of the interconnected network devices utilizing the trunk. The trunk port is layered over a plurality of media access control (MAC) ports which interface to respective links which comprise the trunk.

All physical links of a trunk are configured in parallel and connect identical sets of network nodes. All MACs of a trunk are of the same type; i.e., ethernet, FDDI, Token Ring or any other suitable MAC protocol.

The presently disclosed TCMP serves to detect and avoid invalid physical configurations as well as non-functional MAC ports which may result in improper trunk operation. In accordance with the trunk control message protocol herein described, each MAC associated with a trunk port in a network device is defined to be in one of three possible states, i.e., a "not in use" state, a "selected" state or an "in use" state. The TCMP provides a mechanism for selection of links for participation in the trunk in a manner which achieves the greatest trunk bandwidth for the largest number of network nodes based upon the TCMP messages received on the respective links. Physical links which exhibit configuration or other problems during the activation process are not included in the trunk. Thus, transmission of frames over such problematic links is avoided.

DETAILED DESCRIPTION OF THE INVENTION

Figure 1:
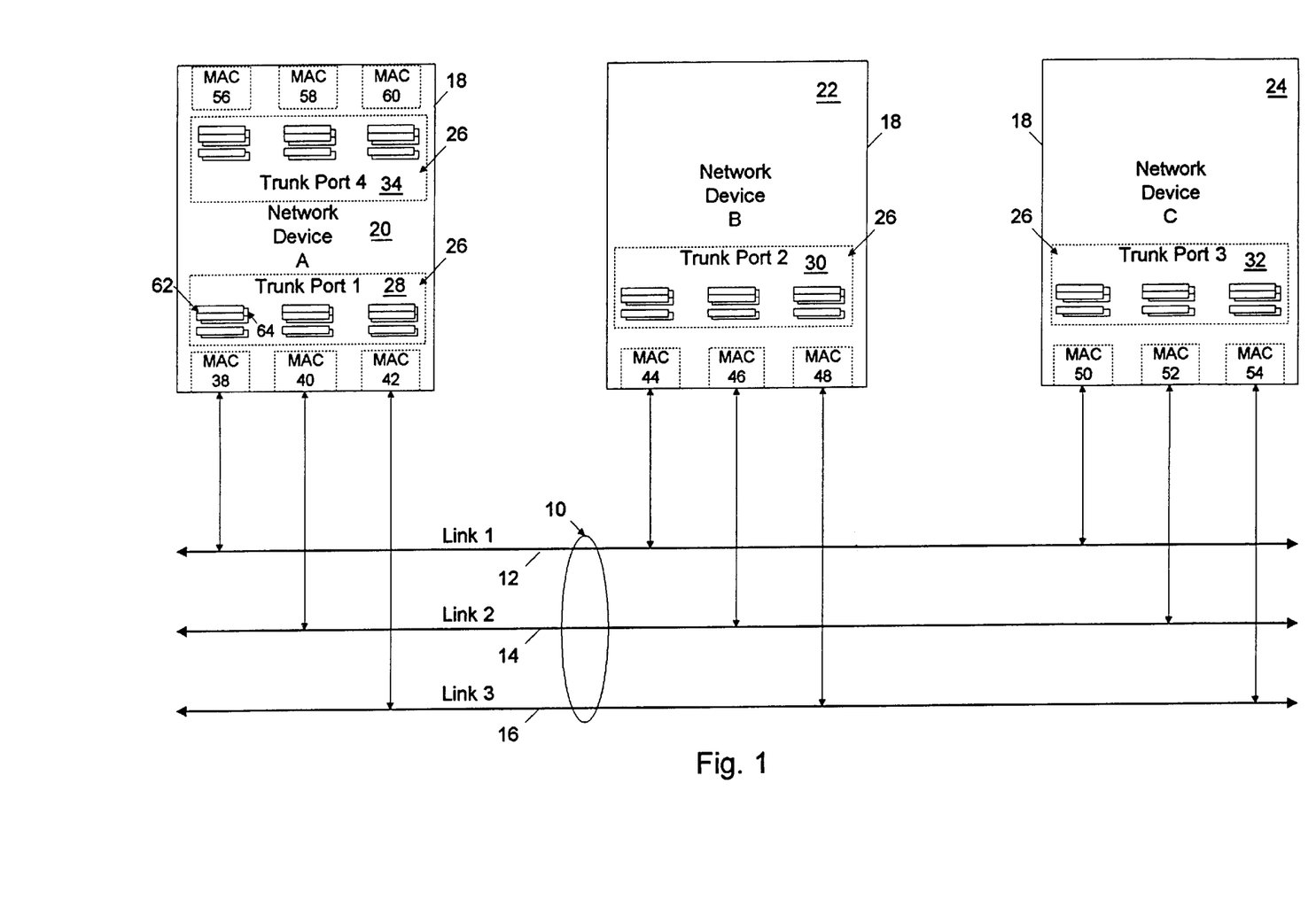
FIG. 1 is illustrative of a network employing a trunking mechanism in accordance with the present invention.

Referring to FIG. 1, a network employing a trunking mechanism in accordance with the present invention is disclosed. A network trunk 10 is illustrated which is capable of carrying network traffic among various network devices 18. More specifically, the network trunk 10 is comprised of a plurality of network links, such as network links 12, 14 and 16. While the trunk is described as having three network links for purposes of illustration, it should be understood that the trunk may comprise two or more network links.

A plurality of network devices 18 such as network device A 20, network device B 22 and network device C 24 are coupled to the network links comprising the trunk 10 through trunk ports 26. More specifically, Network Device A 20 includes a trunk port identified as trunk port 1 28 and a trunk port 4 34 for coupling Network Device A 20 to the trunk 10 through trunk port 1 28 and for coupling Network Device A 20 through trunk port 4 34 to another trunk (not shown).

Trunking permits multiple parallel links such as links 12, 14, 16 to be employed as a single aggregate network trunk with load sharing across the respective links. The trunk thereby provides a single high speed virtual link between multiple network nodes, such as switches, bridges, end stations, or any other connected network devices and provides a higher bandwidth than would be available via a single network link. The trunk ports 26 are layered over a plurality of MACs and are functionally indistinguishable from any other network ports. To all higher layers, such as Spanning Tree Protocol, Routing, VLANs, SNMP, etc. the trunk port is indistinguishable from any other network port.

All networks links participating in a trunk should be configured in parallel. They should all connect exactly the same set of trunk ports defined on the same set of network nodes. They should not contain any loops within the same trunk (two MACs on the same trunk connecting to the same network), though they may contain loops between different trunks with the same node (this might be done for redundancy using the Spanning Tree Protocol to eliminate loops).

The presently disclosed Trunk Control Message Protocol is designed to detect any violation of these rules. It restricts the set of usable MACs within a trunk port to the largest subset of MACs that produces compliance with these rules.

The trunk ports 26 are layered over a plurality of media access control (MAC) interfaces which in turn are coupled to the respective links of the trunk and all network links 12, 14, 16 of the trunk 10 are configured in parallel. The assignment of MACs to specific network device trunk ports 26 is an administrative function and each trunk port 26 is provided which the identification of the MACs assigned to it. For example, as illustrated in FIG. 1, MAC 38, which is associated with trunk port 1 28 of Network Device A 20 is coupled to link 1 12. MAC 40, which is associated with trunk port 1 28 of Network Device A 20 is coupled to link 2 14 and MAC 42 which is associated with trunk port 1 28 of Network Device A 20 is coupled to link 3 16. Thus, trunk port 1 28 in Network Device A 20 is layered over MACs 38, 40 and 42, which couple network device A to links 1, 2 and 3 (12, 14 and 16) respectively. Similarly, trunk port 2 30 in Network Device B 22 is coupled to links 1, 2 and 3 (12, 14 and 16) through MACs 44, 46 and 48 respectively and trunk port 3 32 in Network Device C 24 is coupled to links 1, 2 and 3 (12, 14 and 16) through MACs 50, 52 and 54 respectively. As illustrated trunking is permitted over a plurality of Network Devices 18 and is not restricted to point-to-point trunks. In a preferred embodiment, all MACs of a trunk are the same type such as ethernet MACs, FDDI MACs, Token Ring MACs, etc.

All network devices incorporating the presently disclosed TCMP should be capable of handling the reception of frames on any constituent MAC, regardless of the MAC and network-level destination and source address. In other words, no relationship can be assumed to exist between any particular MAC and any particular source or destination address. This assures that all network devices will be capable of interoperating with other network devices that perform hashing on a combination of source and destination addresses.

The presently disclosed Trunk Control Message Protocol (TCMP) is employed to provide for dynamic control of the configuration and operation of a trunk port and its constituent MAC interfaces. More specifically, the TCMP detects and handles physical configuration errors and ensures the orderly activation and deactivation of MACs associated with a trunk port 26. Additionally, the trunk control message protocol optimizes the trunk configuration via a link selection process which maximizes the bandwidth of the trunk and which attempts to assure that the maximum realizable bandwidth is available to the greatest number of connected network devices in view of the operational status of the MACs and links involved in communication over a particular trunk.

When TCMP is not enabled at a Network Device, the respective Device is capable of operating without TCMP. More specifically, when TCMP is not enabled, the configuration validation afforded by TCMP is not provided.

MAC activation and deactivation proceeds under the control and in accordance with the trunk control message protocol (TCMP). There is a separate instance of the TCMP process (TCMP agent) for each individual trunk port 26 within a network device 18. Accordingly, a TCMP agent would be running on network device A 20 in association with TCMP trunk port 1 28 and another TCMP agent would be running in network device A 20 in association with trunk port 4 34.

Each MAC associated with a particular trunk port is defined as being in a "not is use" state, a "selected" state or an "in use" state.

A MAC which is defined as being in the "not in use" state has not been selected for active participation in the trunk. A MAC in this state neither transmits nor receives frames sourced by layers above the MAC layer. The "not in use" state is the initial state for all MACs of a trunk. A trunk MAC will remain in this state indefinitely if the underlying network link is inoperative. If the trunk control message protocol is enabled for a particular trunk, the MAC will remain in the "not in use" state even if the underlying network link is operative if the TCMP process determines that configuration errors preclude the inclusion of the respective link in the trunk.

A MAC which is defined as being in the "selected" state has been selected for active participation in the trunk, but has not made the transition into active use. A MAC which is in the "selected" state neither transmits nor receives frames sourced by layers above the MAC layer but is eligible to make the transition to the "in use" state as soon as the TCMP process confirms that all other MACs connected to the same network have also been selected. If the TCMP process is not enabled for a trunk then no MAC for the trunk will ever enter the "selected" state.

A MAC which is defined as being in the "in use" state is in active use in the trunk and may transmit and receive frames sourced by layers above the MAC layer. If the TCMP process is not enabled for a trunk, then the respective MAC transitions to the "in use" state as soon as the underlying network link is operative. Thus, a Network Device may employ trunking without the benefits of the TCMP if a connected Network Device does not support TCMP. If the TCMP process is enabled, a MAC will transition to the "in use" state upon confirming that all other MACs connected to the same network link have also been selected.

Figure 2A:
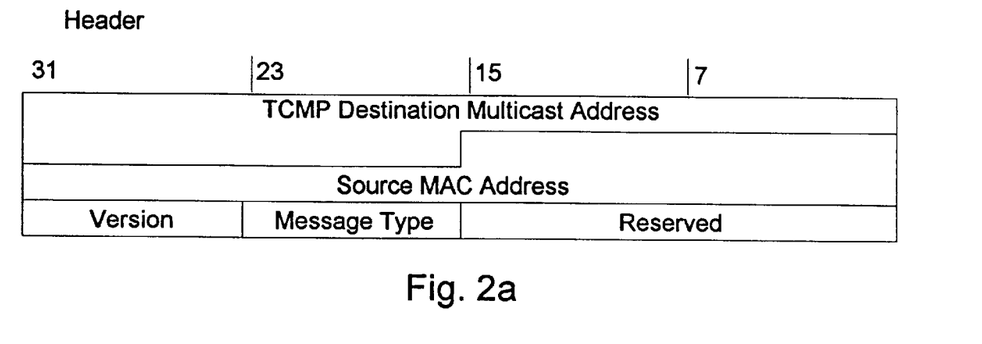
FIG. 2a depicts the content of the header of a "Hello Message" in a trunk control message protocol operative in accordance with the present invention.
Figure 2B:
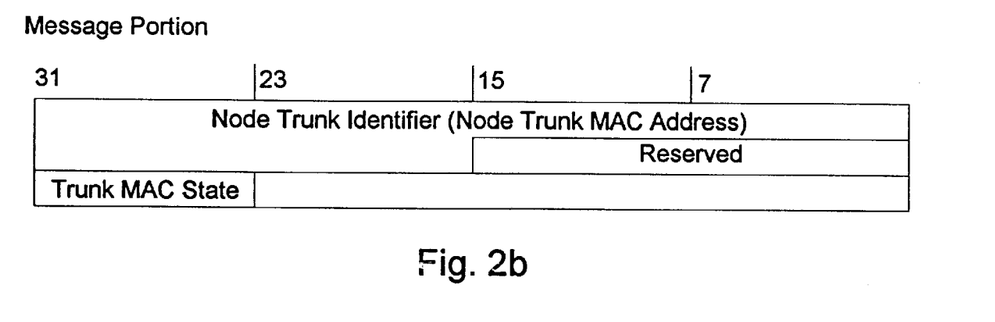
FIG. 2b depicts the content of message portion of the Hello Message in the presently disclosed trunk control message protocol.

The operation of the TCMP agent is further described below. A timer is maintained for every trunk port 26. Each TCMP agent associated with a respective trunk port 26 transmits a TCMP "Hello Message" on every MAC periodically. The period between Hello Message transmissions is referred to herein as the "hello time". The TCMP Hello Message includes a header portion as illustrated in FIG. 2a and a message portion as illustrated in FIG. 2b. Every TCMP hello time, the TCMP-agent transmits a TCMP Hello Message on every MAC. The Hello Message contains the sender's TCMP Node Trunk Identifier which uniquely identifies the instance of a trunk port in the network since the Node Trunk Identifiers are globally unique within the network. The Hello Message also contains the trunking MAC state of the transmitting MAC. The Hello Message is transmitted to a special TCMP multicast address. The Hello Messages are sent to multicast address 01-80-3e-00-00-10 when sent in canonical Ethernet format.

Referring to FIG. 2a, the Hello Message is transmitted from each MAC to the special multicast address for receipt by all other MACs coupled to the respective link. As illustrated in FIG. 2a, the Hello Message header includes the destination multicast address, the source MAC address for the respective transmitting MAC associated with the trunking port 26, an eight bit version field and an eight bit message type field. The version field contains the revision level of the TCMP software and is employed for purposes of assuring compatibility between participating Network Devices 18 in a conventional manner. The initial value of the version field in a preferred embodiment of the invention is 0x01 (alternatively represented 01 (hex)). The message type field contains an identification of the type of message being conveyed in the protocol. In the present case, only a single message type, i.e. a "Hello Message" is employed. The allocation of a message type field permits expansion of the TCMP and utilization of more than one message type should such prove to be desirable.

The message portion of the Hello Message, as illustrated in FIG. 2b, includes a Node Trunk Identifier for the respective trunk port 26 which uniquely identifies the trunk port across the entire network and the trunk MAC state for the respective transmitting MAC interface. While the Node Trunk Identifier may comprise any identifier which provides a unique identifier for the respective trunk port 26 across the network, in the present embodiment, the Node Trunk Identifier is defined to be one of the MAC addresses for a MAC assigned to the respective port. Since all MAC addresses are unique, the use of a MAC address as the Node Trunk Identifier assures that the Node Trunk Identifiers are unique across the entire network. Any suitable selection criteria for choosing a MAC address as the Node Trunk Identifier may be employed. For example, and not by way of limitation, the lowest MAC address for the MACs assigned to the respective trunk port 26 may be selected as the Node Trunk Identifier for a particular trunk port 26. Alternatively, the highest MAC address might also be chosen.

Figure 3:
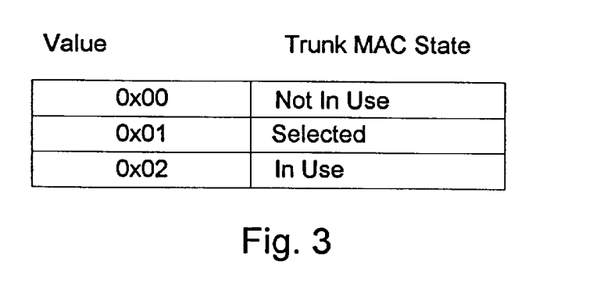
FIG. 3 depicts illustrative values of the trunk MAC states employed in the presently disclosed trunk control message protocol.

The message portion further includes the trunk MAC state of the transmitting MAC; i.e., an indication that the transmitting MAC is in the not in use state, the selected state or the in use state. In a preferred embodiment, as illustrated in FIG. 3 the "not in use state" is assigned a value of 00 [hex], the "selected state" is assigned a value of 01 [hex] and the "in use state" is assigned a value of 02 [hex]. Any suitable values which uniquely define the respective states may be employed in practice.

Several parameters are employed in the presently disclosed implementation of the TCMP which are discussed below. These parameters affect MAC activation and deactivation.

Max Trunks Per Node

This parameter is an implementation-specific limitation that defines the maximum number of trunks that may be created on any individual Network Device. This parameter may be programmably configurable.

Max MACs Per Trunk

This parameter is an implementation-specific limitation that defines the maximum number of MACs that may be assigned to any individual trunk port within a Network Device. All implementations must support a minimum value of at least 2 (otherwise, trunking is effectively nullified). This parameter has an impact on interoperability, since the effective maximum for all nodes connected to the same trunk is the value of the minimum value of all connected nodes. This parameter may be programmably configurable.

The Hello Messages are received at each MAC interface coupled to the respective link and the Node Trunk Identifier and trunk MAC state carried in the respective messages are stored in the Current List 62 associated with the respective MAC interface. It is preferred that the actual number of MACs per trunk not be restricted to powers of 2.

Max Learned Node Trunks Per MAC

This parameter is an implementation-specific limitation that defines the maximum number of Node Trunk Identifiers that a TCMP-agent may learn on any MAC. In effect, this parameter defines the number of Network Devices that may be connected to any constituent network link (this parameter is equal to the maximum number of connected nodes −1). All implementations must support a minimum value of at least 1 (otherwise, trunking is effectively nullified). When set to 1, trunking is restricted to point-point links. This parameter impacts interoperability. This parameter may be programmably configurable.

TCMP Enabled

This boolean parameter defines whether the TCMP is currently enabled for operation on a specific trunk. When false, TCMP is disabled. When true, TCMP is enabled. This parameter impacts interoperability, since all nodes connected to the same trunk must use the same value for MAC activation/deactivation to work effectively. For Network Devices which do not support TCMP, this parameter need not be configurable. For Network Devices which do support TCMP, this parameter is programmably configurable.

Hello Time

This parameter defines the frequency with which the TCMP-agent transmits Hello Messages out each of the MACs of a trunk port. This parameter is relevant only for Network Devices that support TCMP. This parameter is not configurable in the preferred embodiment although it is recognized that this parameter could be programmably configurable. In the preferred embodiment, this parameter is set to 2 seconds.

Reselection Time.

This parameter defines the frequency with which the TCMP-agent performs reselection processing. This parameter is relevant only for Network Devices that support TCMP. This parameter is not configurable and is set to 10 seconds in a preferred embodiment although it is recognized that this parameter could be programmably configurable.

The TCMP-agent maintains a Current and Previous Learned Node List for every MAC. Whenever the TCMP-agent receives a TCMP Hello Message, it adds the Node Trunk Identifier to the Current List (Learned Node Trunk List) for that MAC. If more Node Trunk Identifiers are learned than allowable (Max Learned Node Trunks Per MAC) then a List Overflow indicator is set. The Learned Node Trunk List and List Overflow indicator are cleaned initially and after TCMP Reselection processing.

Every TCMP Reselection Time, the TCMP-agent performs Reselection processing. The goal of Reselection processing is to select the set of MACs which are eligible to go into the In Use MAC state. The TCMP-agent accomplishes this by identifying the Learned Node Trunk List which is common to the greatest number of MACs using the following steps:

1. The TCMP agent first rejects any list which is null or overflowed.

2. The TCMP-agent rejects any list which contains a received Node Trunk Identifier which is identical to the receiving trunk port's Node Trunk Identifier (since this indicates that there are two MACs on the same trunk which connect to the same network).
3. From the remaining set of lists, the TCMP-agent selects the list(s) which is(are) common to the greatest number of MACs. This biases selection towards activating the widest pipe possible. If there is no tie, then a list is selected. Otherwise selection continues as described below.
4. If multiple lists are common to the same number of MACs, then the TCMP-agent selects the list(s) which is longest. For equal bandwidth pipes, this biases selection towards connecting the greatest number of nodes. If there is not a tie, then a list is selected. Otherwise selection continues as described below.
5. If multiple lists are common to the same number of MACs and they connect the same number of nodes, then TCMP-agent selects the list containing the numerically smallest non-intersecting Node Trunk Identifier. For example given two lists of Node Trunk Identifiers, 3-4–6-7 and 3-4-5-8, the second list wins, because 5 is the lowest non-intersecting identifier. There cannot be a tie resulting from this step.

Once the TCMP-agent has selected a Learned Node Trunk List, it forces MAC state changes based on the list selection. If no lists are selected all MACs are set into the Not In Use state. The TCMP-agent forces all MACs whose current Learned Node Trunk List differs from the selected Learned Node Trunk List into the Not In Use state. The agent forces all MACS with identical lists and not already in the In Use state into the Selected state. It allows MACs with identical lists that are already in the In Use state to remain in that state.

Following this Reselection process, the TCMP-agent copies each MAC's current Learned Node Trunk List to its Previous List and then clears each Current List. This allows the Reselection process to be performed completely anew at each Reselection period. The Previous List is used during a quick recovery process resulting from network link outages, as described with more particularity below.

The final step of MAC activation/deactivation involves further MAC state transitions based upon feedback received via the MAC state field of subsequent Hello Messages.

The TCMP-agent produces a MAC state transition from the Selected state to the In Use state once that MAC has received a Hello Message from every previously Learned Node Trunk indicating a MAC state of Selected or In Use. However, to prevent the introduction of new nodes from forcing transitions from the In Use state to the selected state, the first period during which a new node is present in the Previous List, a Hello Message from the new node with a Not In Use MAC state field will not force a transition.

The TCMP-agent ignores the MAC state field in any Hello Messages received from any Trunk Ports which were not previously learned. The TCMP-agent defers processing of such new Trunk Ports until the next reselection.

In order to allow a trunk to recover quickly from an outage of one of its underlying links, a link outage triggers an immediate Reselection process in a preferred embodiment. A Reselection process triggered as a result of a link outage is identical to normal Reselection processing with the following exceptions. Instead of using the Current Learned Node Trunk Lists, the TCMP-agent performs Reselection processing using the Previous Lists. Furthermore, the TCMP-agent clears the Previous List from the MAC associated with the failed link thus effectively eliminating it from the selection process.

Even when TCMP is not enabled on a trunk, there is still a defined process for activating and deactivating MACs.

Initially every MAC starts in the Not In Use state. As soon as the underlying network link comes up, then the MAC should transition to the In Use state. If the underlying network link goes down, then the MAC should transition to the Not In Use state.

Thus, the trunk MAC state directly tracks the underlying network link state. This is particularly important when TCMP is not enabled to assure operation of the trunk in the face of link outages. If a trunk implementation were incapable of detecting link up/down status, then it would have no way of removing inoperative MACs from use. This would result in some "conversations" passing successfully and others unsuccessfully with fault isolation being problematic.

There are several configuration errors that TCMP is incapable of detecting. The user must take care to avoid these errors. TCMP has no way of detecting a node which is not participating in TCMP. If a connected node never sends a Hello Message, then TCMP will not be able to detect that node and its presence will not be considered in determining the trunk MAC state. If the node happens to be connected to every constituent MAC interface which is In Use, then frames will flow correctly. If, on the other hand, the node is not connected to every constituent MAC interface which is In Use, then there is no guarantee that frames destined for the non-compliant node will ever actually reach it (since the hashing algorithm may result in the frames being sent out one of the MACs to which the non-compliant node is not connected).

TCMP also has no way of determining that a compliant connected node is actually the desired node. If a network link is incorrectly connected to a port which is supposed to be part of a different trunk, and if the TCMP-agent happens to select the Learned Node Trunk List received from the associated MAC, then the MAC for the incorrectly configured link will go In Use and all of the MACs for the correctly configured links will go Not In Use.

Figure 4:
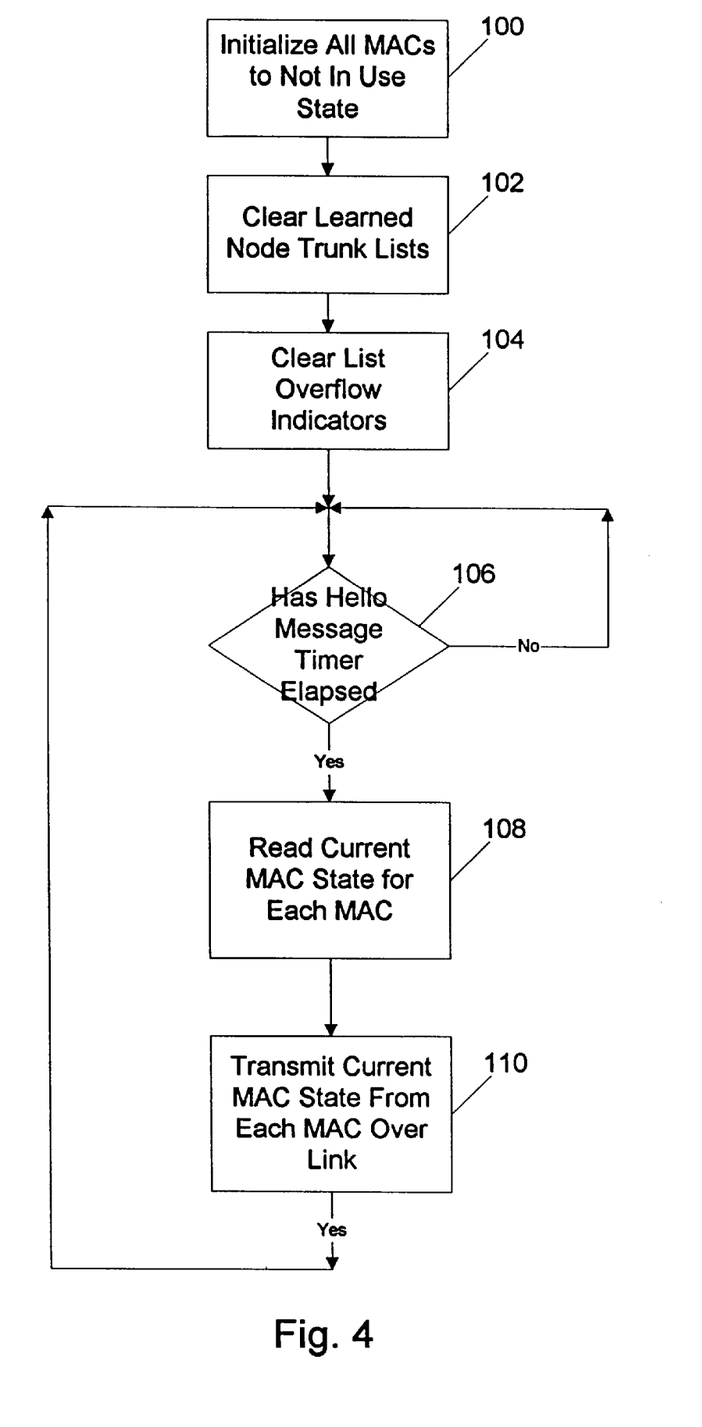
FIG. 4 illustrates a portion of the TCMP involving the transmission of Hello Messages.
Figure 5A:
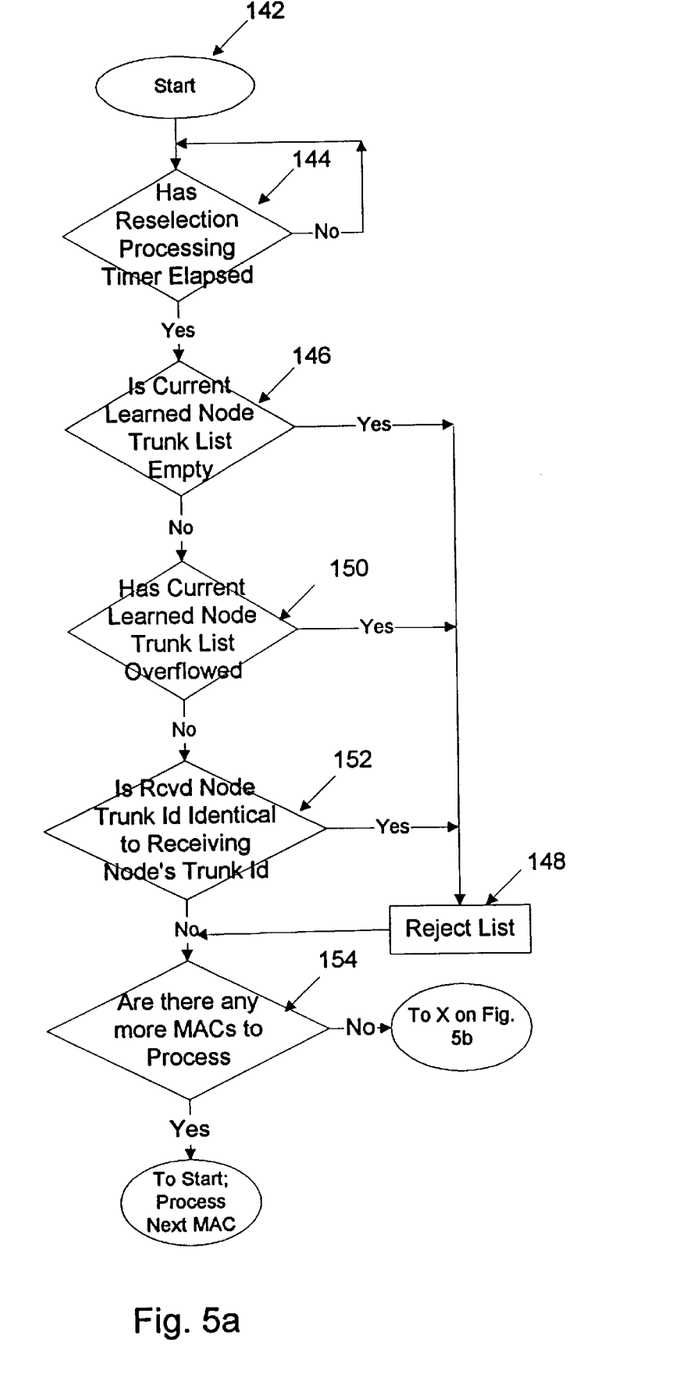
FIG. 5a illustrates a portion of the TCMP method associated with reselection processing.
Figure 5B:
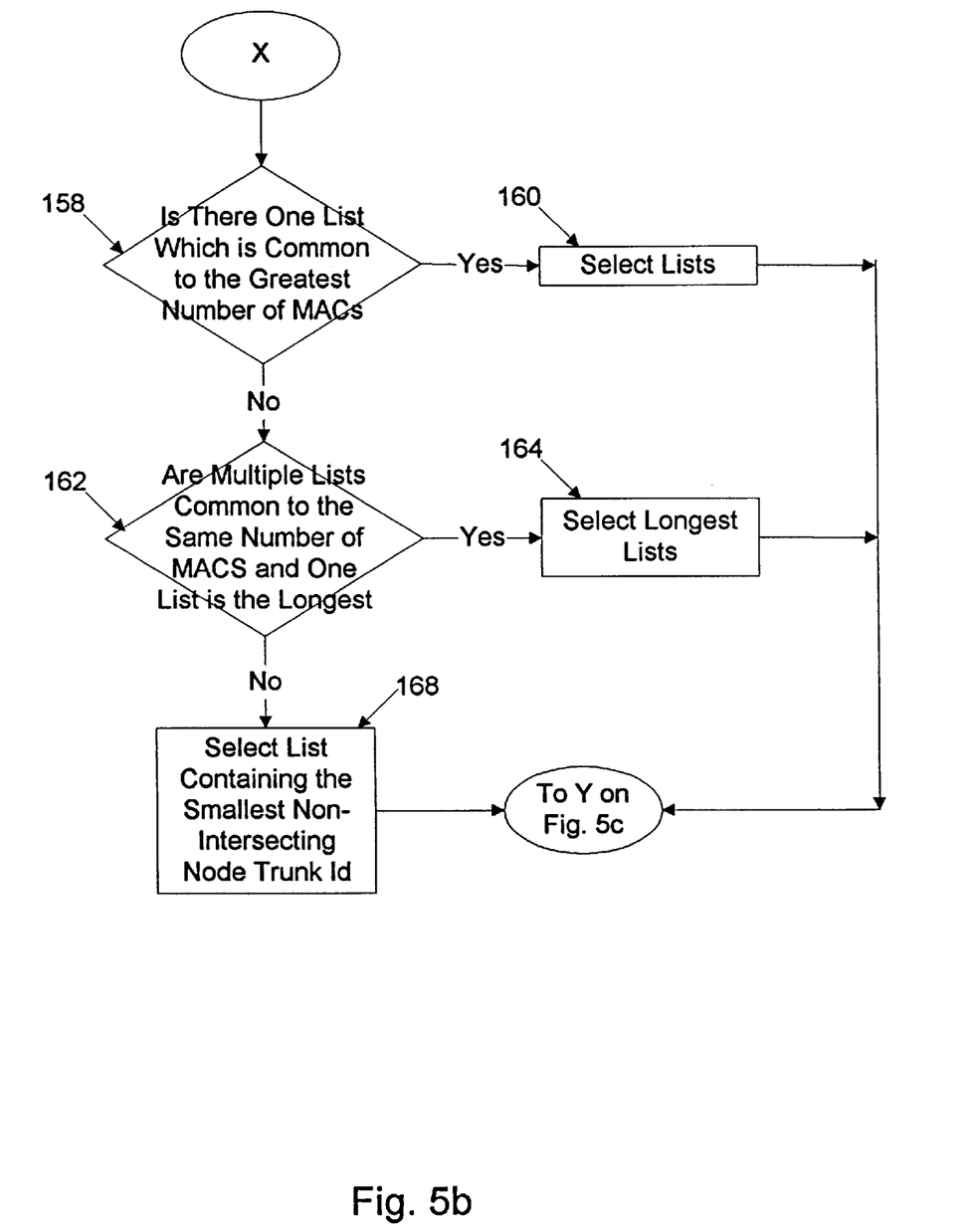
FIG. 5b illustrates another portion of the TCMP method associated with reselection processing.
Figure 5C:
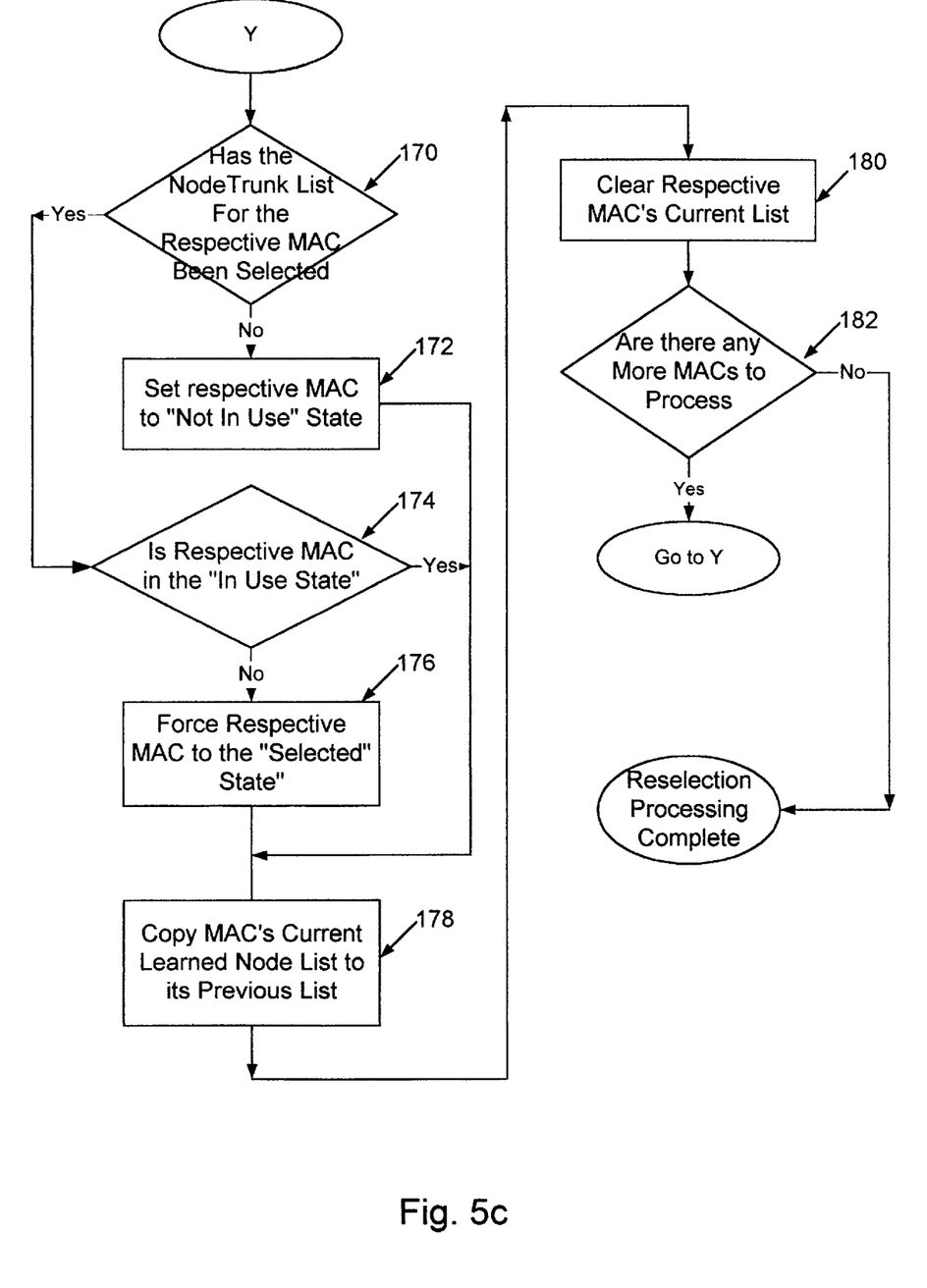
FIG. 5c illustrates another portion of the TCMP method associated with reselection processing.
Figure 5D:
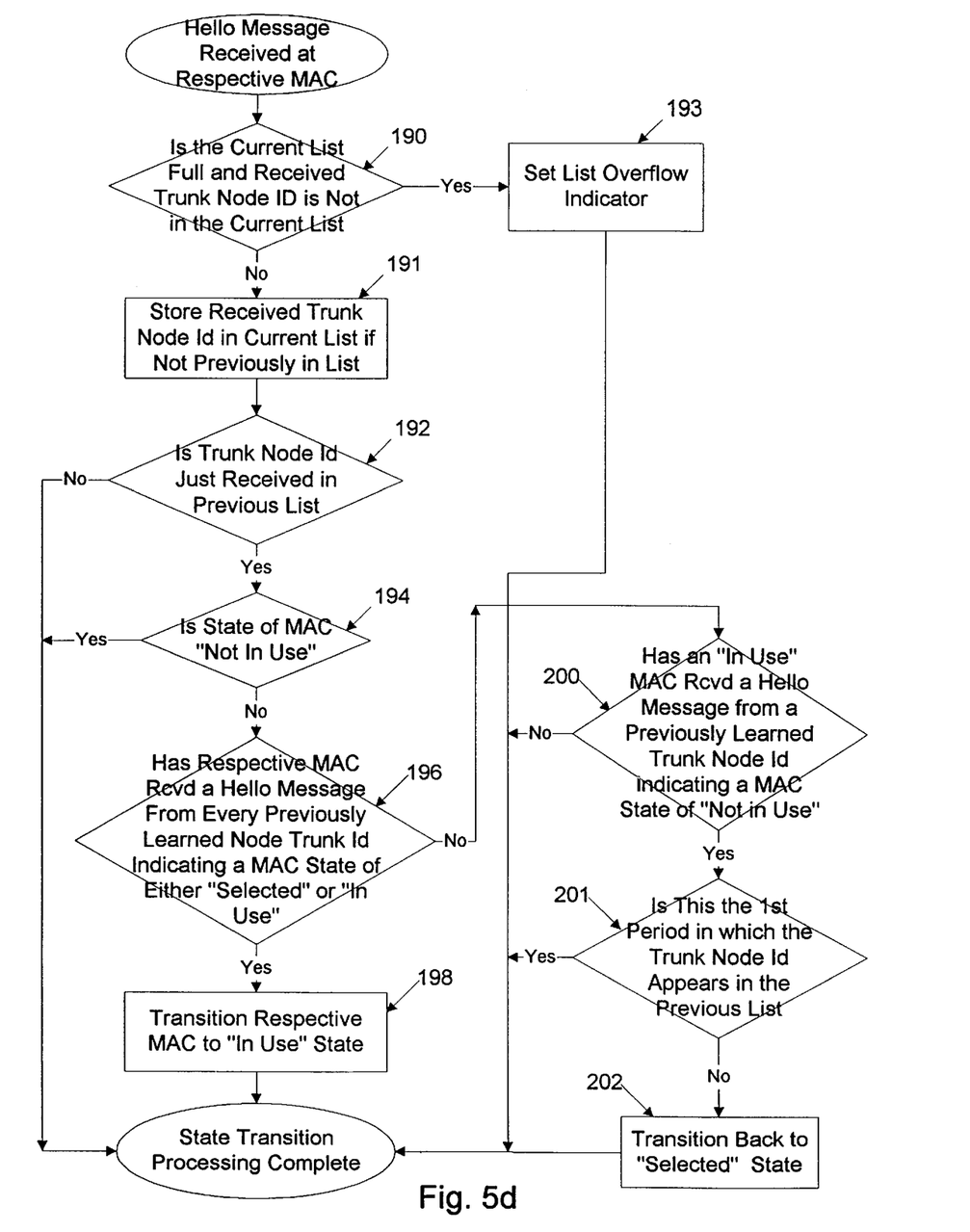
FIG. 5d illustrates a portion of the TCMP method associated with Hello Messages reception and MAC state transitions.
Figure 6:
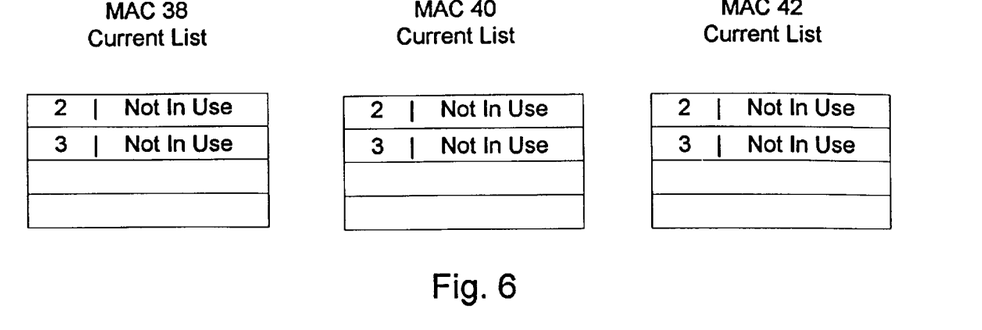
FIG. 6 depicts exemplary Current Lists employed in accordance with the present invention.

The TCMP will be more clearly understood by reference to FIGS. 4–6 which illustrate Hello Message transmission, Hello Message reception processing and reselection processing.

For ease of explanation, the following description is provided with respect to trunk port 1 of Network Device A. It should be appreciated that the same process proceeds at each trunk port 26 of each Network Device 18. Referring to FIG. 4, and as illustrated in step 100, all MACs associated with trunk port 1 of Network Device A are initialized to the Not In Use state. Referring again to FIG. 1, each MAC interface has associated with it, a current storage list (a Learned Node List) 62 of Learned Trunk Node Identifiers and a prior storage list 64 of Learned Trunk Node Identifiers. As further illustrated in FIG. 4, following the initialization of all MAC interfaces of trunk port 1 to the Not In Use state in step 100, the Current List 62 and the prior list 64 of learned Trunk Node Identifiers are cleared as depicted in step 102. For each MAC interface, a number is maintained which identifies the maximum number of Network Devices 18 which may participate in the TCMP process. If, during the TCMP negotiation, messages are received at a respective node/MAC which result in storage of a number of entries within the Current List 62 which is greater than the maximum permissible number, such is indicative of an overflow condition and an overflow indicator is set. As illustrated in step 104, all overflow indicators are cleared prior to initiating Hello Message transmission.

Each trunk port 26 executing the TCMP process has associated with it a "Hello Message" timer. In a preferred embodiment of the invention, the Hello Message timer expires approximately every two (2) seconds although any suitable interval may be employed. Upon expiration of the "Hello Message" timer as indicated by inquiry step 106, the current state of each MAC interface associated with the respective trunk port 26 is read, as shown in step 108, and is subsequently transmitted over the corresponding link as depicted in step 110. All MAC interfaces assigned to the respective trunk port 26 transmit the Hello Message in the format illustrated in FIGS. 2*a* and 2*b*. Since MAC interfaces 38, 40 and 42 of trunk port 1 28 were initialized to the Not In Use state 0×00 (which equals 00 hex) upon the expiration of the Hello Message timer, MACs 38, 40 and 42 each transmit a Hello Message over respective links 1, 2 and 3 with the MAC state set to 0×00. Similarly, following initialization, the respective TCMP agent associated with each other trunk port 26 causes the respective MACs to initiate transmission of Hello Messages upon expiration of their respective timers.

FIG. 5*d* depicts processing upon receipt of a Hello Message at a respective MAC and state transition processing at a MAC in response to receipt of a Hello Message. While FIG. 5*d* illustrates processing at a single MAC of trunk port 1, it should be appreciated that the same method is employed at each MAC of the respective node which is participating in the TCMP. As depicted in FIG. 5*d*, following receipt of a Hello Message, the TCMP agent associated with trunk port 1 determines whether the Current List is Full and whether the received Trunk Node Id is not in the Current List as illustrated in decision step 190. If the Current List is Full and the received Trunk Node Id is not in the Current List, such is indicative of an overflow condition. In the event of such an overflow condition, a List Overflow Indicator is set as shown in step 193 and State Transition Processing for the respective MAC is complete. If inquiry step 190 is answered in the negative, the Trunk Node Identifier contained in the received Hello Message along with the received MAC state are stored in the Current List 62 associated with MAC interface 38 of trunk port 1 28, as noted in step 191. For purposes of illustration and ease of explanation, the Trunk Node Identifiers herein are assumed to be the trunk port numbers rather than the MAC addresses of one of the associated MACs. By way of example, if the received Hello Message was received at MAC interface 38 over link 1 12 from the MAC 44 interface of trunk port 2 30 in Network Device B 22, the Trunk Node Identifier 2 would be stored in the Current List 62 associated with MAC interface 38 and the received trunk MAC state would likewise be stored in the Current List 62. If it is determined in inquiry step 192 that the Trunk Node Id contained in the received Hello Message is present in the Previous List 64, as indicated in step 194, further inquiry is made as to whether the respective MAC is in the "Not in Use" state. If the respective MAC is in the "Not in Use" state, transition processing in response to the received Hello Message is complete. If it is determined in inquiry step 194 that the respective MAC which received the Hello Message is in the "Selected" state or the "In Use" state, further inquiry is made as to whether the respective MAC has received a Hello Message from every previously learned Trunk Node ID indicating a state of "Selected" or "In Use" as illustrated in step 196. If the MAC has received a Hello Message from every previously learned Trunk Node ID indicating a state of "Selected" or "In Use", as illustrated in step 198, the respective MAC transitions to the "In Use" state and transition processing in response to the Hello Message is complete. If the inquiry posed in step 196 is answered in the negative, a further inquiry is made as to whether the respective MAC is "In Use" and has received a Hello Message from a previously learned Trunk Node Id indicating a MAC state of "Not in Use" as depicted in step 200. If no "In Use" MAC has received a Hello Message from a previously learned Trunk Node Id indicating a MAC state of "Not in Use", transition processing in response to the receipt of the Hello Message is complete. If the MAC which received the Hello Message is "In Use" and the Hello Message is from a previously learned Trunk Node Id indicating a MAC state of "Not in Use", a further inquiry is made as to whether this is the first period in which the Trunk Node ID appears in the Previous List as depicted in decision step 201. If this is the first period in which the Trunk Node Id appears in the Previous List, the MAC is not forced back to the "Selected" state. Rather, inquiry step 201 is answered affirmatively and State Transition Processing for the respective MAC is complete. In the event inquiry step 201 is answered in the negative, i.e. the respective Trunk Node Id has appeared in the Previous List in a prior reselection period, as illustrated in step 202, the respective MAC is forced back to the "Selected" state and transition processing in response to receipt of the respective Hello Message is complete.

By way of example, if a Hello Message was received at MAC interface 38 from MAC interface 50 of trunk port 3 32 in Network Device C 24 over link 1, the Trunk Node Identifier 3 would be stored in the Current List 62 along with the trunk MAC state received from MAC interface 50. Thus, after a period of time, assuming links 1, 2 and 3 and all MACs for connected devices on the respective links were operational and properly configured, the Learned Node Lists contained in Current Lists 62 for MAC interfaces 38, 40 and 42 of trunk port 1 would be as illustrated in FIG. 6. It is noted that if a MAC receives a Hello Message containing a Node Trunk Identifier previously received during the reprocessing selection time interval as hereinafter discussed, the duplicate Node Trunk Identifier is not stored in the Current List 62 associated with the recipient MAC.

Periodically, in accordance with the TCMP herein disclosed, reselection processing is performed to determine whether any links should be activated or deactivated; i.e. added to or removed from participation in the trunk. In the preferred embodiment, reselection processing occurs approximately every ten (10) seconds upon expiration of a reselection processing timer although it should be appreciated that it may be desirable to employ other periods for reselection processing in a network.

Reselection processing is described in FIGS. 5*a*, 5*b* and 5*c*. FIG. 5*a* details a portion of TCMP reselection processing associated with list rejection and is performed for each MAC associated with the respective trunk port before proceeding to the portion of reselection processing associated with list selection (illustrated in FIG. 5*b*). Following list selection processing, the TCMP may cause changes in the MAC states of selected MACs in accordance with the method illustrated in FIG. 5*c*.

Following enabling of the TCMP process as illustrated in step 142, the TCMP agent in each respective trunk port periodically initiates reselection processing in accordance with inquiry block 144. Once the reselection process has been activated following expiration of the reselection processing interval timer (which is a ten second interval timer in a preferred embodiment), the Current List 62 associated with each MAC interface is inspected to determine whether the list is empty as indicated in decision step 146. If it is determined that the Current List 62 for a particular MAC is empty, the MAC associated with that Current List 62 is rejected for participation in the trunk as depicted in step 148 and the respective MAC interface will not participate in the trunk within the next reprocessing interval. Inquiry is next made whether there are any more MACs to process, as illustrated in step 154.

If the Current Node Trunk List for the respective MAC is not empty, as illustrated in decision step 150, the TCMP process determines whether an overflow indicator has been set for the respective MAC. In particular, if a Current List 62 for a particular MAC receives more Hello Messages than a maximum number permitted for the MAC, an overflow indicator is set (See FIG. 5d, step 193). If an overflow condition is detected in inquiry step 150, the MAC associated with the Current List 62 is rejected for participation in the trunk as indicated in step 148 and inquiry is made as to whether there are any more MACs to process. In such event, the link associated with the respective MAC does not participate in the trunk during the next reselection time interval.

If the Overflow Indicator is not set for the respective Current List, as indicated in step 152, a determination is next made as to whether any Trunk Node Ids in the Current List are identical to the Trunk Node Id of the respective MAC. In the event that it is determined that a received Node Trunk Identifier is the same as the Node Trunk Identifier associated with the receiving MAC, such indicates that two MAC interfaces associated with one trunk port are connected to the same network link. Upon detection of this situation, the MAC associated with the respective Current List 62 is rejected for participation in the trunk, as indicated in step in 148, and the MAC interface, and the associated network link, are not activated for participation in the trunk during the next reselection processing interval. Inquiry is next made as to whether there are any more MACs to process.

If a determination is made as a consequence of inquiry step 152 that the Current List 62 does not contain a Trunk Node Identifier which is the same as the Trunk node identifier for the receiving MAC, the respective MAC is not rejected. Once all MACs have been individually analyzed for eligibility to participate in the trunk based on the above described criteria, list selection processing is initiated as illustrated in FIG. 5b.

In list selection processing, illustrated in FIG. 5b, the TCMP agent first determines whether there is a single list of Node Trunk Identifiers which is common to the greatest number of MACs, as depicted in decision step 158. The identification and selection of MACs having Current Lists which are common to the greatest number of MACs associated with a trunk port biases the selection toward the activation of the greatest number of links and thus a trunk having the greatest possible bandwidth.

By way of example, referring to FIG. 6, if all links were properly configured and Hello Messages were received in all MAC interfaces from the respective MAC interfaces associated with other trunk ports indicating that the respective trunks were not in use, at reselection processing time, the Current Lists 62 associated with MAC interfaces 38, 40 and 42 would appear as illustrated and all lists would be identical; i.e., MAC interface 38 would have received Hello Messages from MAC interfaces 44 and 50 over link 1 from trunk ports 2 and 3 respectively over link 1 indicating trunk MAC states of not in use. Thus, if all network links were properly configured and the MAC interface were fully functional, in accordance with step 160, the Current Lists for MAC interfaces 38, 40 and 42 would be selected since, a common list exists which is common to all MACs and per MAC state processing continues, as illustrated in FIG. 5c.

Figure 7:
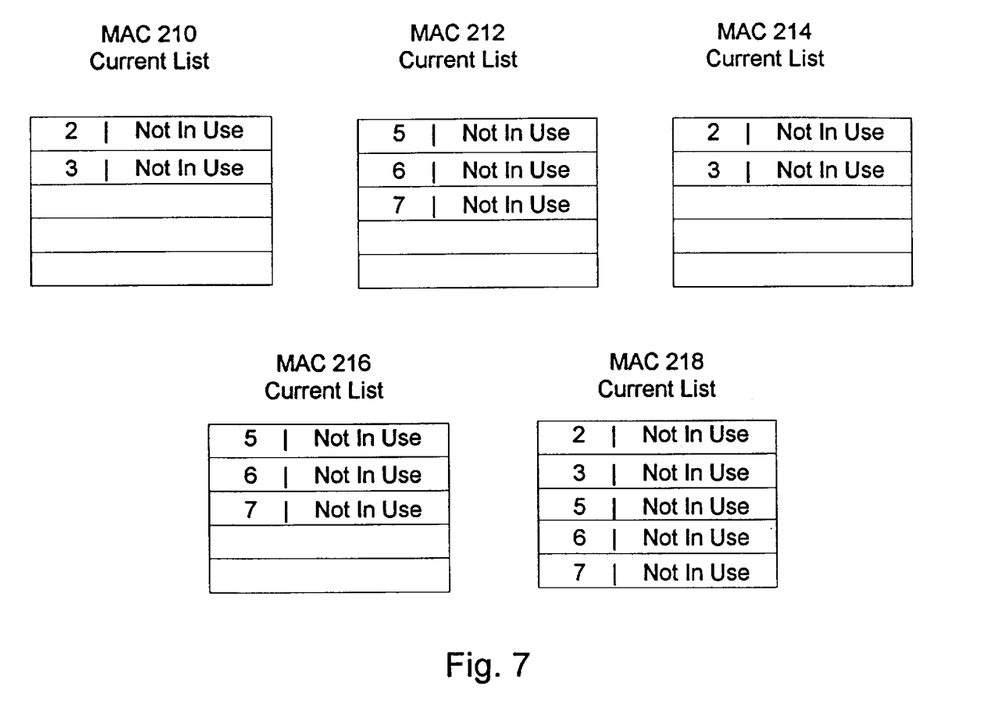
FIG. 7 depicts other exemplary Current Lists employed in accordance with the present invention.

In the event that there is no single list which is common to the greatest number of MACs, inquiry block 158 is not satisfied and processing passes to inquiry block 162. In inquiry block 162 a determination is made whether multiple lists are present which are common to the same number of MAC interfaces and list selection is biased toward lists having the greatest number of entries. This process is illustrated by reference to FIG. 7 in which five exemplary Current Lists associated with MACs 210, 212, 214, 216 and 218 are shown. Such lists are intended to depict Current Lists associated with MACs of a trunk port layered over the five MACs (not otherwise depicted). As shown in FIG. 7 MAC interface 210 has received Hello Messages from trunk ports 2 and 3, MAC 212 has received Hello Messages from trunk ports 5, 6 and 7, MAC 214 has received Hello Messages from trunk ports 2 and 3, MAC 216 has received Hello Messages from trunk ports 5, 6 and 7 and MAC 218 has received Hello Messages from trunk ports 2, 3, 5, 6 and 7. Thus two lists are common to two MACS. In particular, one Current List 62 identifying trunk ports 2 and 3 is common to MAC interfaces 210 and 214 and the Current List 62 identifying trunk ports 5, 6 and 7 is common to MACs 212 and 216. Since multiple lists are present which are common to the same number of MAC interfaces, the TCMP agent selects the list(s) which are longest. In the present example, this biases the selection toward the lists containing three entries, i.e. Current Lists of MACs 212 and 216, rather than the Current Lists of MACs 210 and 214 which contain only two entries. By biasing list selection toward lists having the greatest number of Node Trunk Identifiers the trunk will connect the greatest number of network devices. In the example depicted in FIG. 7, the TCMP agent would thus select Current Lists associated with MACs 212 and 216 which provide the longest list of Node Trunk Identifiers as illustrated in step 164. If decision step 162 results in the identification of multiple lists which are common to the same number of MACs where one list is the longest, following selection of the MACs having the longest Current Lists in step 164, per MAC state processing continues as illustrated in FIG. 5c.

If multiple lists are common to the same number of MAC interfaces and two or more (different) lists connect the same number of trunk ports 26, step 162 would be answered in the negative and processing would proceed to step 168. The Current Lists are then selected which have the smallest non-intersecting Trunk Node Identifier and per MAC State Processing is inititated as illustrated in FIG. 5c. For example, if Current Lists associated with two MACs of trunk port n contained Trunk Node identifiers 3, 4, 6 and 7 and if Current Lists associated with two other MACs of trunk port n contained Trunk Node Identifiers 3, 4, 5 and 8 (both are common to the same number of MACs), the Current Lists containing entries 3, 4, 5 and 8 would be selected in step 168 because Trunk Node Identifier 5 is the lowest non-intersecting Trunk Node Identifier and per MAC state processing would then proceed as illustrated in FIG. 5c.

Following list selection in accordance with the method illustrated in FIG. 5b, per MAC state processing proceeds as the last portion of reselection processing. As depicted in FIG. 5c, state processing is performed separately for each MAC. In inquiry step 170, a determination is made whether the Node Trunk List for the respective MAC has been selected. If it is determined in inquiry step 170 that the MACs Node Trunk List has not been selected, as depicted in step 172, the respective MAC state is set to the "Not in Use" state and the respective MAC's current Learned Node Trunk List is then copied to its Previous List as depicted in step 178. If it is determined in step 170 that a Node Trunk List associated with the respective MAC has been selected as a result of the list selection process illustrated in FIG. 5b, a further inquiry is made to determine if the respective MAC is in the "In Use" state. If the respective MAC is in the "In Use" state, inquiry step 174 is answered affirmatively and the respective MACs Current Learned Node Trunk List is copied to its Previous List as shown in step 178. If inquiry step 174 is answered in the negative, i.e. the MAC is not in the "In Use" state, the respective MAC is forced to the "Selected" state as illustrated in step 176 and the MACs Current Learned Node Trunk List is then copied to its Previous List as depicted in step 178. After the Current List is copied to the Previous List for the respective MAC, the Current List is cleared in accordance with step 180. The per MAC state processing method illustrated in FIG. 5c is repeated for each MAC associated with the respective trunk port. When per MAC state processing has been completed for all MACs associated with the respective trunk port, inquiry step 182 is answered in the negative and reselection processing is complete.

Since a trunk port 26 employs multiple MACs, for any frame destined for transmission out of a trunk port, the network device must implement a MAC interface selection algorithm to determine which of the constituent MAC interfaces should be used for the transmission. In a preferred embodiment, MAC interface selection assures that no frame reordering occurs on any relevant source to destination communication.

Any suitable MAC selection algorithm may be employed to spread the traffic across the constituent MAC interfaces of the trunk. For bridged frames, a MAC interface selection algorithm is preferred which selects the constituent MAC interface based upon a hashing algorithm applied to the MAC Destination Address (MDA) and the MAC Source Address (MSA) of each frame. Using the MDA and MSA of each frame provides for more equal sharing of traffic across the respective links of the trunk 10 than would be achieved using either the MDA or the MSA alone.

For routed frames, the recommended mechanism is to perform a hashing algorithm on each frame's network-level DA and SA fields.

The MAC selection algorithms should not be applied to frames generated at the MAC layer and targeted for transmission out a specific MAC, such as FDDI SMT frames and Trunking TCMP frames.

Transmissions of frames sourced from layers above the MAC layer from a trunk port must not proceed through a MAC interface which is not currently in the "In Use" state as defined above. Additionally frame reordering should be prevented when a MAC transitions into or and out of the "In Use" state.

A preferred embodiment of a trunking method and apparatus to facilitate trunking among a plurality of network devices has been disclosed. In should be understood that other embodiments and variations of the presently disclosed methods and apparatus may be employed without departing from the inventive concepts disclosed herein. Accordingly, the invention is not to be viewed as limited except as by the scope and spirit of the appended claims.

What is claimed is:

1. In a network device having a trunk port comprising a plurality of MAC interfaces, wherein each of said MAC interfaces is coupled to a corresponding network link, a method for selecting particular ones of said MAC interfaces to determine which of said network links will be accessible as a trunk by said trunk port, said method comprising the steps of:

transmitting messages from said plurality of MAC interfaces of said trunk port of said network device to other respective MAC interfaces of other network devices coupled to said transmitting MAC interfaces via respective links, said messages comprising a unique identifier of said transmitting trunk port and state information pertaining to the transmitting MAC interface;

receiving at respective MAC interfaces of said network device a plurality of messages comprising unique entries identifying other transmitting trunk ports and state information pertaining to respective transmitting MAC interfaces associated with said other trunk ports of other network devices and storing said received entries and state information in lists associated with the respective receiving MAC interfaces of said network device;

selecting certain ones of said lists associated with said plurality of MAC interfaces based upon predetermined selection criteria; and selecting particular ones of said MAC interfaces for use as active MAC interfaces in said trunk port corresponding to the MAC interfaces associated with the lists selected pursuant to said list selecting step.

2. The method of claim 1 wherein each of said plurality of MAC interfaces has a MAC state comprising one of a first state, a second state and a third state and said transmitting step comprises the step of transmitting messages from each of said plurality of MAC interfaces of said trunk port of said network device to other respective MAC interfaces of other network devices coupled to said transmitting MAC interfaces via respective links, said messages comprising a unique identifier of said trunk port associated with the respective transmitting MAC interface and state information pertaining to the transmitting MAC interface indicative of the MAC state of the respective transmitting MAC interface.

3. The method of claim 2 wherein said first state is indicative that the respective MAC interface has not been selected for active participation by said trunk port, said second state is indicative that the respective MAC interface has been selected for active participation by said trunk port but is not yet participating in the transmission of frames and said third state is indicative that the respective MAC interface is in active use transmitting frames over the corresponding network link which forms one link of said trunk.

4. The method of claim 3 wherein said method further comprises the step of initializing all MAC interfaces associated with said trunk port of said network device to said first state.

5. The method of claim 4 wherein said list selecting step further comprises the step of transitioning each respective MAC interface from said first state to said second state upon determining that the list associated with the respective MAC interface has been selected.

6. The method of claim 5 wherein said list selecting step further comprises the step of transitioning each respective MAC interface from said second state to said third state upon confirming that all other MAC interfaces associated with other network devices connected to the respective network link are in one of said second state and said third state.

7. The method of claim 1 wherein said list selecting step occurs periodically.

8. The method of claim 7 wherein said list selecting step occurs approximately every ten (10) seconds.

9. The method of claim 2 wherein said transmitting step is performed periodically.

10. The method of claim 9 wherein said transmitting step is performed approximately every two (2) seconds.

11. The method of claim 1 wherein said list selecting step comprises the step of rejecting any stored lists which have no entries.

12. The method of claim 11 wherein said receiving step further comprises the step of setting an overflow indicator associated with each MAC interface of said network device in the event the number of unique entries identifying other transmitting trunk ports stored in the list associated with the respective MAC interface exceeds a predetermined number.

13. The method of claim 12 wherein said list selecting step further comprises the step of rejecting any stored lists for which the associated overflow indicator has been set.

14. The method of claim 13 wherein said list selecting step further comprises the step of rejecting any stored lists which contain an identifier of a transmitting trunk port which is the same identifier as said trunk port of said network device.

15. The method of claim 1 wherein said list selecting step further comprises the step of selecting.

16. The method of claim 15 wherein said list selecting step further comprises the step of selecting a set of stored lists which have the greatest number of entries in the event multiple sets of lists exist in which the entries within the lists of each set are common, the entries within lists of the respective sets differ, and the number of lists within each set is the same.

17. The method of claim 16 wherein said list selecting step further comprises the step of selecting the set of lists which contain the smallest non-intersecting entry in the event there are multiple sets of lists which are common to the same number of MAC interfaces and such lists contain the same number of entries.

18. Apparatus for selecting particular communication links of a plurality of network communication links for participation as links of a network trunk, said apparatus comprising:
a trunk port within a network device, said trunk port comprising:
a plurality of MAC interfaces, each of said MAC interfaces in electrical communication with a different one of said plurality of said network communication links;
a plurality of storage lists associated with corresponding ones of said plurality of MAC interfaces for storing information contained in messages received at the respective MAC interfaces;
a trunk controller, said trunk controller operative to:
initiate the transmission of messages from said plurality of MAC interfaces containing an identifier uniquely identifying said trunk port within said network and information indicative of a MAC state of the respective MAC interface;
receive messages at the respective MAC interfaces of said trunk port from a transmitting MAC interface associated with a transmitting trunk port, wherein said received messages contain an identifier uniquely identifying said transmitting trunk port and a MAC state of the transmitting MAC interface associated with said transmitting trunk port; and
to store said identifier and said MAC state information from said received messages in a storage list associated with the respective MAC interface at which the message was received;
said trunk controller being further operative to select certain ones of said storage lists based upon predetermined selection criteria and to select particular ones of said plurality of MAC interfaces for active participation in said trunk corresponding to the respective MAC interfaces associated with selected storage lists.

19. The apparatus of claim 18 wherein said apparatus further includes a first timer which produces a first signal, and said trunk controller is operative to initiate transmission of said messages from said plurality of MAC interfaces in response to said first signal.

20. The apparatus of claim 19 wherein said first timer produces said first signal periodically.

21. The apparatus of claim 18 wherein said first timer produces said first signal approximately every 2 seconds.

22. The apparatus of claim 19 wherein said apparatus further includes a second timer which produces a second signal, and said trunk controller is operative to initiate said selection of said storage lists in response to said second signal.

23. The apparatus of claim 22 wherein said second timer produces said second signal periodically.

24. The apparatus of claim 23 wherein said second timer produces said second signal approximately every ten (10) seconds.

25. The apparatus of claim 22 wherein said trunk controller is further operative to transmit messages from each of said plurality of MAC interfaces indicating that the respective MAC interface is in one of a first state indicating that the respective MAC interface has not been selected for participation as a MAC interface for said trunk, a second state indicating that the respective MAC interface has been selected for active participation as a MAC interface for said trunk but is not yet enabled for transmission of frames from the respective MAC interface and a third state indicating that the respective MAC interface has been enabled for the transmission of frames over the corresponding network communication link, wherein said corresponding network communication link forms one link of said trunk.

26. The apparatus of claim 25 wherein said trunk controller is operative to initialize all MAC interfaces associated with said trunk port to said first state.

27. The apparatus of claim 26 wherein said trunk controller is operative in response to said second signal to transition each respective MAC interface from said first state to said second state in response to a determination that the storage list associated with the respective MAC interface has been selected based upon said predetermined selection criteria.

28. The apparatus of claim 22 wherein said trunk controller is operative to transition each respective MAC interface associated with a selected storage list from said second state to said third state in response to said second signal and following a determination that all entries within the respective storage list contain a state value which is in one of said second state and said third state.

29. The apparatus of claim 28, wherein said trunk controller is operative, in response to receipt of said second signal, to set each MAC interface associated with one of said selected storage lists to said second state, in the event the respective MAC interface is not in said third state.

30. The apparatus of claim 22 wherein said trunk controller is operative to reject any storage lists which have no entries.

31. The apparatus of claim 30 wherein each of said plurality of MAC interfaces has associated therewith a storage location comprising an overflow indicator and the respective overflow indicator is set in the event that the storage list associated with the respective MAC interface contains a number of entries greater than a predetermined number.

32. The apparatus of claim 31 wherein said trunk controller is operative, in response to receipt of said second signal, to reject any storage lists for which the respective overflow indicator for the associated MAC interface has been set.

33. The apparatus of claim 32 wherein said trunk controller is further operative, in response to receipt of said second signal, to reject any storage lists which contain an identifier of a transmitting trunk port which is the same as the identifier for said trunk port of said network device.

34. The apparatus of claim 33 wherein said trunk controller is operative in response to said second signal to select from the plurality of storage lists, other than said rejected storage lists, the set of storage lists which have common entries and which are common to the greatest number of MAC interfaces.

35. The apparatus of claim 34 wherein said trunk controller is operative to select from said plurality of storage lists, the set of storage lists which have the greatest number of common entries in the event multiple sets of lists exist in which the entries within the lists of each set are common and differ collectively from the entries within the lists of each other set, and the number of lists within each set are common to the same largest number of MAC interfaces.

36. The apparatus of claim 29 wherein said trunk controller is operative to set all MAC interfaces associated with the storage lists, other than said selected storage lists, to said first state.

37. The method of claim 6 further comprising the step of transitioning each respective MAC interface from said third state to said second state upon confirming receipt of a message containing one of said plurality of unique identifiers which was previously stored in the list associated with the respective MAC interface wherein said received message indicates that the transmitting MAC interface associated with said unique identifier is in said first state.

38. The apparatus of claim 35 wherein said trunk controller is operative to select one set of storage lists out of a plurality of sets of storage lists in the event each set of storage lists comprises lists having the same entries within each list of the respective set, the collective entries within the lists of each set differ from the collective entries of the lists within other sets, each set comprises the same number of lists, and the lists within each set contain the same number of entries.

39. The apparatus of claim 38 wherein said trunk controller is operative to select particular ones of said plurality of storage lists which have the lowest non-intersecting unique identifier in the event said selected particular ones of said storage lists comprise one set of a plurality of sets of said storage lists, the entries within lists of each set are common within the respective set, the lists contain the same number of entities in each of said plurality of sets, and the number of lists in each set having common entries are the same.

\* \* \* \* \*

UNITED STATES PATENT AND TRADEMARK OFFICE
CERTIFICATE OF CORRECTION

PATENT NO. : 5,949,788
DATED : September 7, 1999
INVENTOR(S) : G. Stodel Friedman, et al.

It is certified that error appears in the above-identified patent and that said Letters Patent is hereby corrected as shown below:

Column 16, claim 21,
Line 13, "claim 18", should read -- claim 20 --;

Column 16, claim 30,
Line 61, "claim 22", should read -- claim 18 --.

Signed and Sealed this

Eighteenth Day of September, 2001

*Attest:*

*Attesting Officer*

NICHOLAS P. GODICI
*Acting Director of the United States Patent and Trademark Office*